US007579595B2

(12) United States Patent
Micko

(10) Patent No.: US 7,579,595 B2
(45) Date of Patent: Aug. 25, 2009

(54) PIR MOTION SENSOR

(75) Inventor: Eric Scott Micko, Rescue, CA (US)

(73) Assignee: Suren Systems, Ltd., Hong Kong (HK)

( * ) Notice: Subject to any disclaimer, the term of this patent is extended or adjusted under 35 U.S.C. 154(b) by 0 days.

(21) Appl. No.: 11/853,220

(22) Filed: Sep. 11, 2007

(65) Prior Publication Data

US 2008/0074252 A1 Mar. 27, 2008

Related U.S. Application Data

(60) Provisional application No. 60/843,173, filed on Sep. 11, 2006.

(51) Int. Cl.
*G01J 5/00* (2006.01)

(52) U.S. Cl. .................................................. 250/338.3

(58) Field of Classification Search .... 250/338.1–338.5
See application file for complete search history.

(56) References Cited

U.S. PATENT DOCUMENTS

| | | | | |
|---|---|---|---|---|
| 5,461,231 | A * | 10/1995 | Sugimoto et al. | 250/342 |
| 2005/0184869 | A1 * | 8/2005 | Micko | 340/567 |
| 2007/0040672 | A1 * | 2/2007 | Chinigo | 340/539.22 |

* cited by examiner

*Primary Examiner*—David P Porta
*Assistant Examiner*—Kiho Kim
(74) *Attorney, Agent, or Firm*—John L. Rogitz

(57) ABSTRACT

A passive infrared sensor has two or more element arrays, each consisting of positive polarity and negative polarity elements. The signals from the arrays are both summed together and subtracted from each other, and if either the sum or difference signal exceeds a threshold, detection is indicated.

8 Claims, 2 Drawing Sheets

PIR MOTION SENSOR

PRIORITY CLAIM

Priority is claimed from U.S. provisional patent application 60/843,173, filed Sep. 11, 2006.

RELATED APPLICATIONS

This is related to the following U.S. patent applications, incorporated herein by reference: Ser. No. 11/134,780; Ser. No. 11/097,904; Ser. No. 10/600,314 (U.S. patent publication 2004/0169145); Ser. No. 10/388,862 (U.S. patent publication 2004/40140430).

I. FIELD OF THE INVENTION

The present invention relates generally to motion sensors.

II. BACKGROUND OF THE INVENTION

The referenced applications disclose simple PIR motion sensors with low false alarm rates and minimal processing requirements that are capable of discriminating smaller moving targets, e.g., animals, from larger targets such as humans, so that an alarm will be activated only in the presence of unauthorized humans, not pets.

The present invention critically recognizes that particularly with respect to ceiling-mounted sensors, owing to the use of positive and negative detector elements, it is possible for signals from objects to be monitored to cancel along some lines of bearing. In other words, the present invention recognizes that ceiling-mounted detectors inherently have longer detection ranges along some lines of bearing and shorter detection ranges along other lines of bearing. As understood herein, it is desirable to provide a single ceiling-mounted detector that has relatively uniform detection capability along all lines of bearing.

SUMMARY OF THE INVENTION

A PIR motion sensor includes first and second arrays of pyroelectric elements. A processor receives respective first and second signals representative of the outputs of the first and second arrays. The processor adds the first and second signals together to establish a sum signal and subtracts the first signal from the second signal to establish a difference signal. The processor then determines, for each of the sum signal and the difference signal, whether detection should be indicated.

In non-limiting implementations the difference signal can be generated by reversing the polarity of the first signal and then adding the first signal with polarity reversed to the second signal. Each non-limiting array may include at least four elements, two with positive polarity and two with negative polarity. Each element in the first array may be azimuthally straddled by elements of the second array. In some embodiments the elements of each array are electrically connected to each other in the following azimuthal order with respect to polarity: positive to negative to positive to negative. The sensor can be mounted on the ceiling to establish a relatively uniform detection space independent of an objects azimuth from the sensor, or the sensor can be mounted on a wall.

In another aspect, a passive infrared sensor has two or more element arrays. Each array consists of positive polarity elements and negative polarity elements. Signals from the arrays are both summed together and subtracted from each other for at least some detection cycles. Detection and/or motion is indicated if either the sum signal or the difference signal exceeds a threshold.

In still another aspect, a computer readable medium is executable by a processing system to receive first signals from a first array of pyroelectric elements and to receive second signals from a first array of pyroelectric elements. The logic includes adding the first signal to the second signal to establish a sum signal and subtracting the first signal from the second signal to establish a difference signal. Only if neither the sum signal nor the difference signal meets a detection criteria, detection is not indicated. Otherwise detection in indicated.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
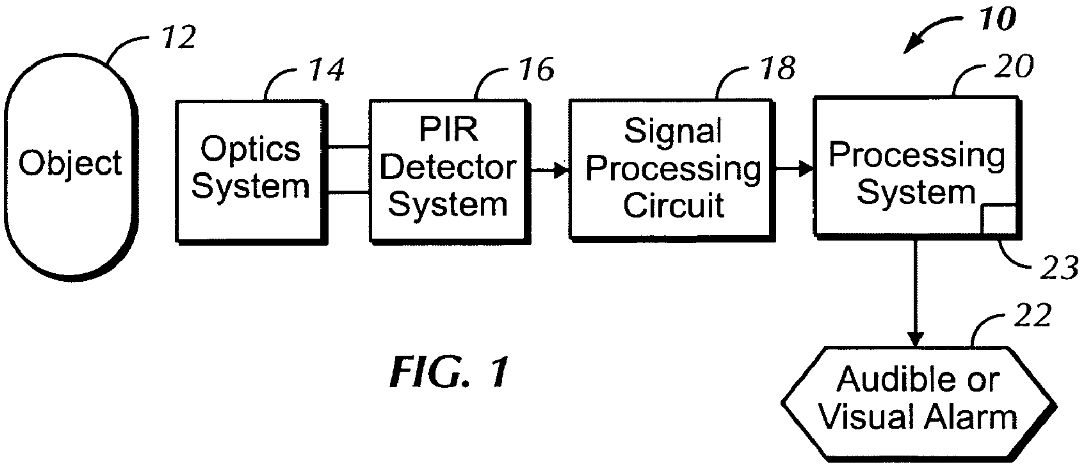
FIG. 1 is a block diagram of the present system architecture.

Referring initially to FIG. 1, a system is shown, generally designated 10, for detecting a moving object 12, such as a human. The system 10 includes an optics system 14 that can include appropriate mirrors, lenses, and other components known in the art for focussing images of the object 12 onto a passive infrared (PIR) detector system 16. The disclosure below discusses various embodiments of the PIR detector system 16. In response to the moving object 12, the PIR detector system 16 generates a signal that can be filtered, amplified, and digitized by a signal processing circuit 18, with a processing system 20 (such as, e.g., a computer or application specific integrated circuit) receiving the signal and determining whether to activate an audible or visual alarm 22 or other output device such as at activation system for a door, etc. in accordance with the logic herein and illustrated in a non-limiting embodiment by FIG. 8. The logic may be implemented on a computer readable medium 23 associated with the processing system 20. The computer readable medium may be logic circuits, solid state computer memory, disk-based storage, tape-based storage, or other appropriate computer medium.

Figure 2:
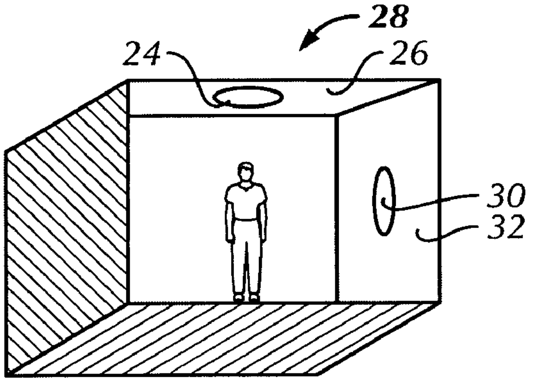
FIG. 2 is a schematic view showing a sensor in accordance with present principles mounted on a ceiling, and another sensor mounted on a wall.

FIG. 2 shows that a detector 24 in accordance with present principles may be mounted on a ceiling 26 of a building 28. In addition to or in lieu of the first detector 24, a second detector 30 in accordance with present principles may be mounted on a wall 32 of the building 28. The mounting can be accomplished using adhesives, fasteners, etc.

Figure 3:
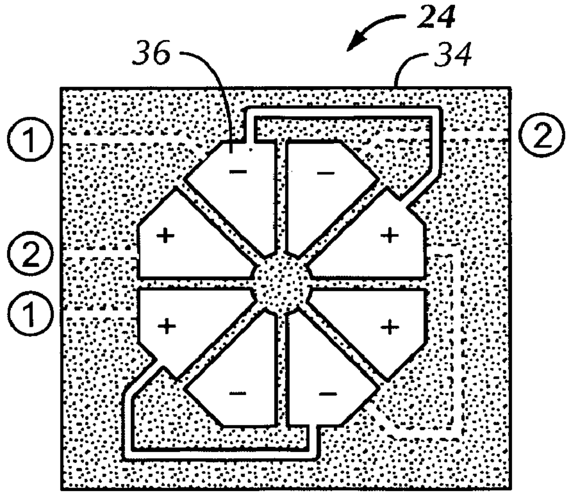
FIG. 3 is a plan view of a sensor in accordance with present principles.
Figure 4:
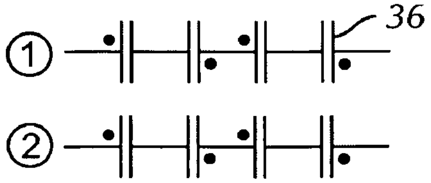
FIG. 4 is a schematic symbol diagram representing the elements in FIG. 3 as capacitors with the dots indicating polarity.
Figure 5:
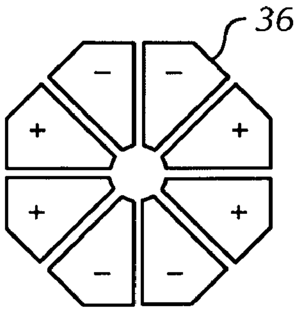
FIG. 5 is a functional diagram of the elements shown in FIG. 3.

Having described the overall system architecture, reference is now made to FIGS. 3-5, which show a first embodiment of the PIR sensor of the present invention. As shown, IR detection means for a PIR sensor 24 can include a single, preferably ceramic substrate 34 on which are formed first and second PIR element groups, also referred to herein as "arrays", and labeled "1" and "2" in FIGS. 3-5.

As shown, each group includes four elements 36, with each element 36 having a positive or negative polarity, it being understood that greater or fewer elements per group may be used. As shown best in FIG. 3, the elements of group "1" are electrically connected to each other and to, e.g., the signal processing circuit 18/processing system 20 shown in FIG. 1. Likewise, the elements of group "2" are electrically connected to each other and to, e.g., the signal processing circuit 18/processing system 20 shown in FIG. 1. The elements of each group may be electrically connected to each other in the following azimuthal order with respect to polarity: positive to negative to positive to negative. As shown in FIG. 3, in some embodiments one positive element and one negative element from each group may be connected off-chip to external circuitry. Group "1" elements are azimuthally staggered with respect to group "2" elements, i.e., each element of group "1" is straddled by elements of group "2" and vice-versa as shown.

The two groups of arrays may be thought of as two detectors. It is to be understood that the detectors are pyroelectric detectors that measure changes in far infrared radiation. Such detectors operate by the "piezoelectric effect", which causes electrical charge migration in the presence of mechanical strain. Pyroelectric detectors take the form of a capacitor—two electrically conductive plates separated by a dielectric. The dielectric is often a piezoelectric ceramic. When far infrared radiation causes a temperature change (and thus some mechanical strain) in the ceramic, electrical charge migrates from one plate to the other. If no external circuit is connected to the detector, then a voltage appears as the "capacitor" charges. If an external circuit is connected between the plates, then a current flows.

In any case, the detector 24 produces two separate signals in response to images passing over the detector due to, e.g., humans passing through the monitored sub-volumes created by the compound optics 14 (FIG. 1). As set forth further below in reference to FIG. 8, the two signals can be, on the one hand, added together, and, on the other hand, added together with one of the signals' polarity reversed with respect to the signal baseline (thus in effect subtracting one signal from the other). This process, which is executed in at least some detection cycles, creates two new signals, referred to herein as the "sum" and "difference" signals.

Figure 6:
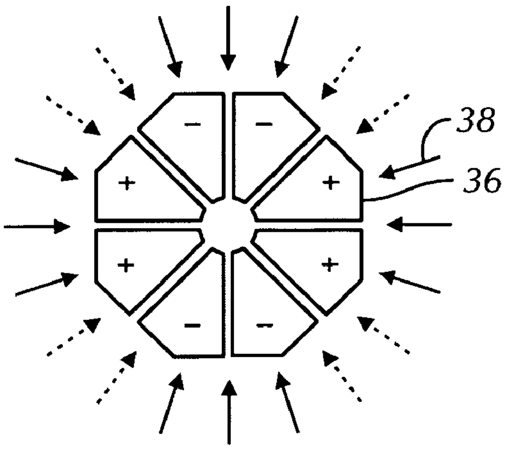
FIG. 6 is a schematic diagram showing employment of the "sum" signal.
Figure 7:
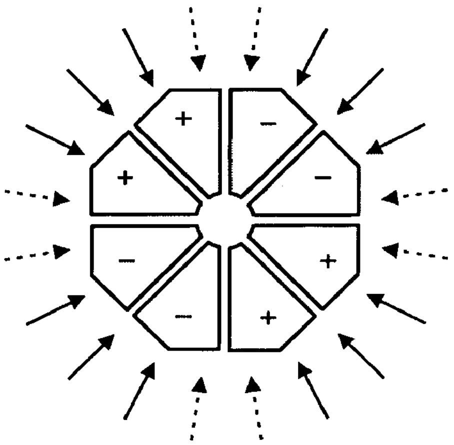
FIG. 7 is a schematic diagram showing employment of the "difference" signal.
Figure 8:
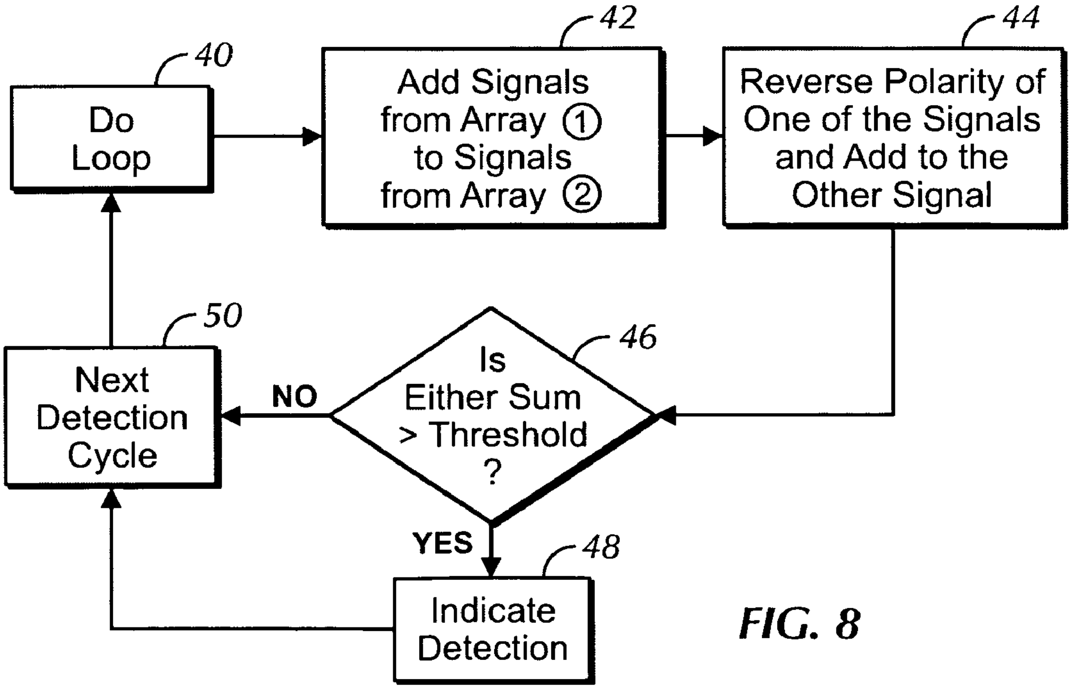
FIG. 8 is a flow chart of the present logic.

Prior to discussing the logic of FIG. 8, reference is first made to FIGS. 6 and 7 for a graphical depiction of the operation of the present detector. The arrows 38 indicate infrared radiation impinging on the elements 36.

As illustrated in FIGS. 6 and 7, in response to image shapes that lie at different angles across the plane of the detector (caused by a human moving around the sensor at relatively long range), the two new signals each are largest when the image shapes lie along four orthogonal directions, but the two signals largest-response directions are offset from each other by forty five degrees. Specifically, in FIG. 6, in the case where the "sum" signal is employed, the detector 24 functions as a single array, with its eight detector elements 36 having the polarities shown. Arrows 38 show directions from which the detector array is sensitive to radiation comprising images arriving from lenses (or other optical elements) oriented in the direction of the arrows. Dashed arrows show image-orientation directions (at about forty five degree angles to the solid arrows) to which the detector array is much less sensitive, because the images fall on both (+) and (−) polarity elements (whose signals will be summed as polarized, thus yielding little signal).

FIG. 7 shows the same detector element array as FIG. 6, except with four of its elements' polarities reversed, so as to indicate the effect of employing the "difference" signal. Arrows 38 again show directions from which the detector array is sensitive to radiation comprising images arriving from lenses (or other optical elements) oriented in the direction of the arrows. Dashed arrows show image-orientation directions (at about forty five degree angles to the solid arrows) to which the detector array is much less sensitive, because the images fall on both (+) and (−) polarity elements (whose signals will be summed as polarized, thus yielding little signal).

Thus, in effect, by choosing whether to consider the sum or difference signals from such a detector array, a PIR sensor may vary its detection directional orientation. However, in the preferred non-limiting implementation the sensor is designed not to be directionally selective, but rather to provide relatively uniform coverage regardless of azimuth.

Accordingly, referring now to FIG. 8, at block 40 a "DO" loop is entered for each of at least some detection cycles, wherein at block 42 the signals from array "1" are added to those from array "2" to yield the above-discussed "sum" signal. Additionally, at block 44 the polarity of one of the array signals is reversed and added to the signal from the other array, in effect producing the above-discussed "difference" signal. At decision diamond 46 it is determined whether either one of the signals (i.e., either the "sum" or "difference" signal) exceeds a threshold. Typically, the amplitude of the signal is used for this purpose. If the threshold is exceeded, detection is indicated at state 48. From state 48, or from decision diamond 46 if neither the "sum" nor the "difference" signal exceeded the threshold, the logic enters the next detection cycle at block 50.

It is to be understood that equivalently, the test at decision diamond 46 may be executed immediately after block 42, and if the "sum" signal exceeds the threshold the logic can flow directly to block 48, bypassing the need to calculate the "difference" signal at block 44. In such an implementation, in the event that the "sum" signal does not trigger a detection determination, the "difference" signal may then be determined and tested against the threshold. It will readily be appreciated that in this latter embodiment, both the "sum" and "difference" signals are calculated in some, but not all, detection cycles.

In effect, the use of the two sets of directional signals is to combine them in a signal peak height logical "OR" arrangement. This is to say that both signals are evaluated by the processing system 20, so that either the "sum" signal OR the "difference" signal exceeding a threshold may indicate detection. In effect, this combines the best detection directions from both signals, by ignoring the smaller signal. The outcome is a lack of relatively insensitive detection directions in a ceiling-mounted PIR sensor, and instead, relatively uniform sensitivity in all directions.

Present principles are not limited to ceiling-mounted sensor applications, as discussed above in the case of the wall-mounted sensor 30. Because the detector enables creation of a sensor that detects moving images oriented along any axis, this novel wall-mounted sensor 30 (i.e. with the plane of its detector's substrate approximately parallel to the wall) can be mounted in any detector-rotational orientation. Because the sensor can be used interchangeably on the ceiling or the wall an entirely new class of PIR motion sensor is provided that is a universal commodity which is very easy both to keep in stock and to install.

Furthermore, present principles can be used with more or fewer elements than those shown, and with more or fewer groups of elements whose signals can be combined by addition, subtraction or by other means. Also, the binary concept of splitting each element into two halves is not presented as a limiting concept for organizing the detector element arrays.

While the particular IMPROVED PIR MOTION SENSOR is herein shown and described in detail is fully capable of attaining the above-described objects of the invention, it is to be understood that the invention is limited only by the appended claims.

What is claimed is:

1. A PIR motion sensor comprising:

at least a first array of pyroelectric elements;

at least a second array of pyroelectric elements; and at least one processor receiving respective first and second signals representative of the outputs of the first and second arrays, the processor adding the first and second signals together to establish a sum signal and subtracting the first signal from the second signal to establish a difference signal, the processor determining, for each of the sum signal and the difference signal, whether detection should be indicated, wherein the sensor is mounted on a ceiling, wherein each array includes at least four elements, two with positive polarity and two with negative polarity, wherein each element in the first array is azimuthally straddled by elements of the second array.

2. The sensor of claim 1, wherein the difference signal is generated by reversing the polarity of the first signal and then adding the first signal with polarity reversed to the second signal.

3. The sensor of claim 1, wherein the elements of each array are electrically connected to each other in the following azimuthal order with respect to polarity: positive to negative to positive to negative.

4. A passive infrared sensor having two or more element arrays, each array consisting of positive polarity elements and negative polarity elements, signals from the arrays being both summed together and subtracted from each other for each of at least some detection cycles, detection and/or motion being indicated if either the sum signal or the difference signal exceeds a threshold, wherein the sensor is mounted on a ceiling, wherein each array includes at least four elements, two with positive polarity and two with negative polarity, wherein the elements of each army are electrically connected to each other in the following azimuthal order with respect to polarity: positive to negative to positive to negative.

5. The sensor of claim 4, wherein the difference signal is generated by reversing the polarity of a first signal from a first array and then adding the first signal with polarity reversed to a second signal of a second army.

6. The sensor of claim 4, wherein each element in a first army is azimuthally straddled by elements of a second array.

7. A computer readable medium executable by a processing system to undertake logic comprising:

receiving first signals from a first ceiling-mounted array of pyroelectric elements;

receiving second signals from a second ceiling-mounted array of pyroelectric elements;

adding the first signal to the second signal to establish a sum signal;

subtracting the first signal from the second signal to establish a difference signal;

only if neither the sum signal nor the difference signal meets a detection criteria, not indicating detection, and otherwise indicating detection, wherein each array includes at least four elements, two with positive polarity and two with negative polarity, wherein each element in the first army is azimuthally straddled by elements of the second array, wherein the elements of each array are electrically connected to each other in the following azimuthal order with respect to polarity: positive to negative to positive to negative.

8. The medium of claim 7, wherein the difference signal is generated by reversing the polarity of the first signal and then adding the first signal with polarity reversed to the second signal.

* * * * *